US006612103B2

(12) United States Patent
Matsuda et al.

(10) Patent No.: US 6,612,103 B2
(45) Date of Patent: Sep. 2, 2003

(54) LINK PLATE FOR A SILENT CHAIN (75) Inventors: Akio Matsuda, Mie (JP); Tsujii Yoshitomo, Mie (JP); Kenichi Matsuura, Mie (JP)

(73) Assignee: BorgWarner Morse TEC Japan K.K. (JP)

( * ) Notice: Subject to any disclaimer, the term of this patent is extended or adjusted under 35 U.S.C. 154(b) by 0 days.

(21) Appl. No.: 09/917,345

(22) Filed: Jul. 27, 2001

(65) Prior Publication Data

US 2002/0078675 A1 Jun. 27, 2002

(30) Foreign Application Priority Data

Jul. 27, 2000 (JP) ........................................ 2000-226520

(51) Int. Cl.[7] .............................................. F16G 13/04
(52) U.S. Cl. ............................................. 59/5; 474/213
(58) Field of Search ........................... 59/4, 5, 6, 8, 91; 474/212, 213, 214

(56) References Cited

U.S. PATENT DOCUMENTS 4,509,323 A    4/1985  Ledvina et al.
4,509,937 A    4/1985  Ledvina et al.
5,154,674 A  * 10/1992  Avramidis et al. .......... 474/214

FOREIGN PATENT DOCUMENTS

JP    57-179454    * 11/1982    ...................... 59/5

* cited by examiner

*Primary Examiner*—Lowell A. Larson
(74) *Attorney, Agent, or Firm*—Fitch, Even, Tabin and Flannery; Greg Dziegielewski (57) ABSTRACT To provide a type of link plate for a silent chain characterized by the fact that the link plate can be differentiated by appearance from the other link plates. The link plate has a pair of teeth, each of which has an inside flank surface, an outside flank surface and a tooth tip part that connects them, with the outside flank surface and the back side part connected to each other by a shoulder part. For the tooth tip part, a portion is cut off on the side toward the outside flank surface to form a cut portion, and, on the shoulder part, a bump portion is formed projecting outward. By means of the cut portion and the bump portion, it is possible to differentiate the link plate from other link plates different from it with respect to one or several properties, such as plate thickness, material, heat treatment, hardness and finish processing of pin holes.

18 Claims, 6 Drawing Sheets

LINK PLATE FOR A SILENT CHAIN

FIELD OF THE INVENTION

This invention pertains to a type of link plate for a silent chain and having a pair of teeth, a type of silent chain containing the link plates, and a method for assembling the silent chain.

BACKGROUND OF THE INVENTION

Figure 9:
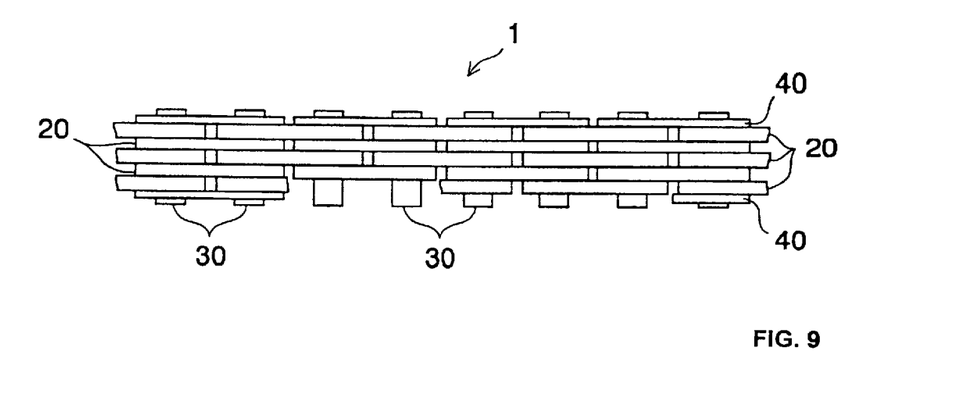
FIG. 9 is a side view of a portion of a silent chain.

As shown in the side view of FIG. 9, a silent chain usually has plural link plates 20 stacked in the thickness direction and in the longitudinal direction. They are connected by connecting pins 30 in pivoting manner, and guide links 40 are arranged on the outside of the outermost link plates 20.

Figure 8:
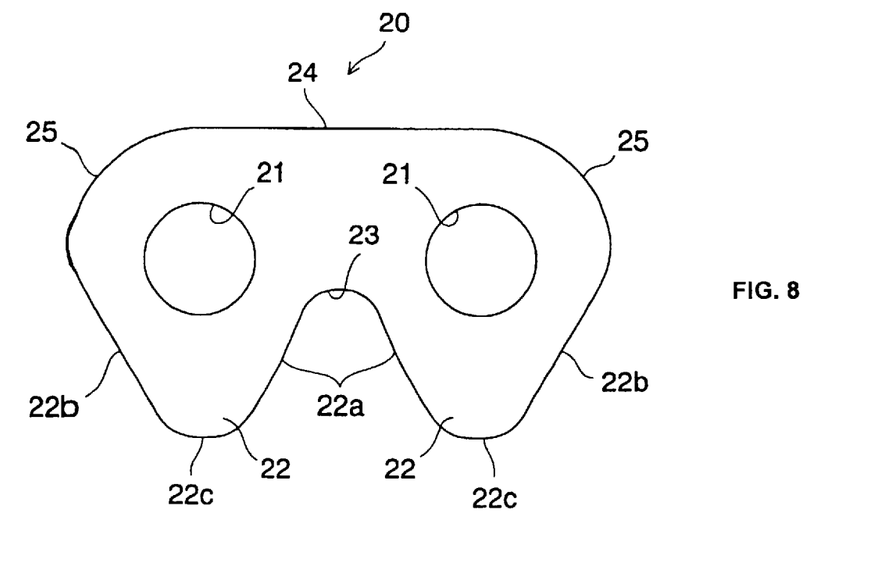
FIG. 8 is an enlarged front view of a conventional link plate.

As shown in the enlarged view of FIG. 8, each of link plates 20 that form silent chain 1 has a pair of pin holes 21 for inserting the connecting pins, and a pair of teeth 22 extending downward. Tooth 22 is composed of nearly arcuate inside flank surface 22a, nearly straight outside flank surface 22b, and tooth tip part 22c that connects them, and adjacent inside flank surfaces 22a are connected by crotch 23. Also, link plate 20 has nearly straight back side part 24, and back side part 24 and outside flank surface 22b are connected to each other by nearly arcuate shoulder part 25.

In silent chains developed recently, link plates with different plate thicknesses are used in the same silent chain. Also, there is demand for the use of link plates having different materials, heat treatments, or hardnesses within the same silent chain.

In this case, when the link plates having different plate thicknesses, materials, heat treatments, or hardnesses are assembled, it is necessary to differentiate the various types of link plates from each other in order to set them at their respective appropriate positions. However, all of the link plates have the same outer shape in the conventional silent chain, so that in the assembly operation it is hard to differentiate the link plates having different materials, heat treatments, or hardnesses from each other by their appearances. Also, for link plates having different plate thicknesses, because the difference in plate thickness is only a fraction of a millimeter, it is not easy to identify link plates having different plate thicknesses.

SUMMARY OF THE INVENTION

The invention provides a solution to the aforementioned problems of the conventional methods by providing a type of link plate that can be identified by its appearance, a type of silent chain having different types of link plates mixed together, and a method for assembling such a silent chain. The invention also provides a checking method to determine whether two types of link plates in the silent chain are placed at their respective designated positions.

According to a first aspect of the invention a type of link plate for a silent chain may be provided having a pair of teeth, each of which is composed of an inside flank surface, an outside flank surface and a tooth tip part that connects them. The tooth tip part can have a shape formed by cutting off a portion on the side toward the outside flank surface.

According to a second aspect of the invention a type of link plate for a silent chain may be provided having a pair of teeth, each of which is composed of an inside flank surface and an outer side surface. The outside flank surface and the back side part can be connected by a shoulder part having a bump portion that projects outward.

According to a third aspect of the a type of link plate for a silent chain may be provided having a pair of teeth, each of which is composed of an inside flank surface and an outside flank surface and a tooth tip part that connects them. The outside flank surface and the back side part can be connected by a shoulder part. The tooth tip part may have a shape formed by cutting off a portion on the side toward the outside flank surface and the shoulder part may have a bump portion that projects outward.

Thus, the link plate pertaining to the first aspect of the invention may be formed with a portion of the tooth tip part cut off on the side toward the outside flank surface. In the second aspect of the invention, a bump portion projecting outward may be formed on the shoulder part of the link plate. In the third aspect of the invention, the link plate may be formed with a portion of the tooth tip part of the link plate cut off on the side toward the outside flank surface, and with a bump portion projecting outward formed on the shoulder part of the link plate. In this way, according to the aspects of the invention, the link plates can be differentiated easily from each other and from conventional link plates.

Also, the portion pertaining to the difference in appearance of the link plate is preferably not the portion pertaining to engagement with the sprocket, and it is preferably irrelevant to the strength of the link plate. From this viewpoint, the portion of the tooth tip part on the side toward the outside flank surface and the shoulder part may be selected for this purpose.

According to another aspect of the invention a type of silent chain may be provided having a plurality of link plates, each of which may have a pair of pin holes for inserting connecting pins and a pair of teeth each composed of an inside flank surface, an outside flank surface and a tooth tip part that connects them. The plural link plates can be connected to each other by the connecting pins in a pivotable manner. The link plates may include both a first type of link plates, which may have the tooth tip part shaped by cutting off a portion on the side toward the outside flank surface, and a second type of link plates, which may have the tooth tip part not shaped by cutting off a portion on the side toward the outside flank surface, and the two types of link plates may be mixed together.

According to another aspect of the invention a type of silent chain may be provided having a plurality of link plates, each of which has a pair of pin holes for inserting connecting pins and a pair of teeth each composed of an inside flank surface and an outside flank surface, with the outside flank surface and the back side part connected to each other with a shoulder part. The plurality of link plates may be connected to each other by the connecting pins in a pivotable manner. The link plates may include a first type of link plates each having a bump portion projecting outward from the shoulder part, and a second type of link plates without a bump portion projecting outward from the shoulder part, and the two types of link plates may be mixed together.

According to yet another aspect of the invention a type of silent chain may be provided having a plurality of link plates, each of which has a pair of pin holes for inserting connecting pins and a pair of teeth each composed of an inside flank surface, an outside flank surface and a tooth tip part that connects them, with the outside flank surface and the back side part connected to each other by a shoulder part. The plurality of link plates can be connected to each other by the connecting pins in a pivotable manner. The link plates may include a first type of link plates, which have the tooth tip part shaped by cutting off a portion on the side toward the outside flank surface and which have a bump portion projecting outward from the shoulder part, and a second type of link plates, which have the tooth tip part not shaped by cutting off a portion on the side toward the outside flank surface and which have no bump portion projecting outward from the shoulder part, and the two types of link plates may be mixed together.

For the silent chain pertaining to one of the above-described aspects of the invention, a first type of link plate having a shape with a portion of the tooth tip part cut off on the side toward the outside flank surface and a second type of link plate having no such portion of the tooth tip part cut off on the side toward the outside flank surface may be mixed together. For the silent chain pertaining to another above-described aspect of the invention, a first type of link plate having a bump portion projecting outward from the shoulder part and a second type of link plate having no such bump portion projecting outward from the shoulder part may be mixed together. For the silent chain pertaining to yet another of the above-described aspects of the invention, a first type of link plate having a shape with a portion of the tooth tip part cut off on the side toward the outside flank surface and having a bump portion projecting outward from the shoulder part and a second type of link plate having no such portion of the tooth tip part cut off on the side toward the outside flank surface and having no such bump portion projecting outward from the shoulder part may be mixed together.

For the above described aspects of the invention, the first and second link plates described in them can be differentiated from each other by appearance. Consequently, it is possible to mix the first and second link plates together in the same silent chain.

According to an aspect of the invention, the silent chain described in the above aspects of the invention may be provided having the first and second link plates different from each other with respect to one or more of the following properties: plate thickness, material, heat treatment, hardness, and finish processing of the pin holes. Because the difference in plate thickness, material, heat treatment, hardness or pin hole finish processing is not clearly manifested in the appearance, the difference may be made clearly identifiable by means of the shape of the tooth tip part or shoulder of the link plate. Here, the difference in pin hole finish processing refers to difference between the case of finish processing by shaving processing etc. of the pin hole and the case of no finish processing.

According to another aspect of the invention, a method for assembling a silent chain according to an above-described aspect of the invention may be provided including detecting with a sensor or identifying with an identification gate whether the tooth tip part of the link plate has a shape with a portion cut off on the side toward the outside flank surface. When the link plate is detected by the sensor or identification gate to have a shape with a portion of the tooth tip part cut off, it can be set at the configuration position for the first type of link plate. When the link plate is detected by the sensor or identification gate to not have a shape with a portion of the tooth tip part cut off, it is set at the configuration position for the second type of link plate, and the first and second link plates may be connected to each other by connecting pins in a pivotable manner.

According to yet another aspect of the invention, a method may be provided for assembling a silent chain according to an above-described aspect of the invention including detecting with a sensor or identifying with an identification gate whether the shoulder part of the link plate projects outward. When the link plate is detected by the sensor or identification gate to have a shoulder part that projects outward, it can be set at the configuration position for the first type of link plate. When the link plate is detected by the sensor or identification gate to not have a shoulder part that projects outward, it can be set at the configuration position for the second type of link plate and the first and second link plates can be connected to each other by connecting pins in a pivotable manner.

According to another aspect of the invention, a method for assembling the silent chain according to an above-described aspect of the invention may include detecting with a first sensor or identifying with a first identification gate whether the tooth tip part of the link plate has a shape with a portion cut off on the side toward the outside flank surface, and detecting with a second sensor or identifying with a second identification gate whether the shoulder part of the link plate projects outward. When the link plate is detected by the first and second sensors or the first and second identification gates to have a shape with a portion of the tooth tip part cut off and to have a shoulder part projecting outward, it may be set at the configuration position for the first type of link plate. When the link plate is detected by the first and second sensors or the first and second identification gates to not have a shape with a portion of the tooth tip part cut off and to not have a shoulder part that projects outward, it may be set at the configuration position for the second type of link plate and the first and second link plates can be connected to each other by connecting pins in a pivotable manner.

For the method of assembly of the silent chain in accordance with an aspect of the invention, whether the link plate has a shape with a portion of the tooth tip part cut off on the side toward the outside flank surface may be detected with a sensor or may be identified with an identification gate. Also, according to another aspect of the invention, whether the shoulder part of the link plate projects outward may be detected with a sensor or may be identified with an identification gate. In addition, according to yet another aspect of the invention, whether the link plate has a shape with a portion of the tooth tip part cut off on the side toward the outside flank surface may be detected with a first sensor or may be identified with a first identification gate, and whether the shoulder part of the link plate projects outward may be detected with a second sensor or may be identified with a second identification gate.

Here, the identification gate refers to a gauge that has a hole shaped to match the contour of the link plate. For example, when this hole corresponds to the contour of the link plate having a shape with a portion of the tooth tip part cut off, the link plate with a portion of the tooth tip part cut off can pass through the identification gate, while the link plate without a portion of the tooth tip part cut off cannot pass through it. In this way, the identification gate can identify the two types of link plates.

According to further aspects of the invention, the first and second types of link plates according to above aspects of the invention can have their difference in appearance identified with a sensor or an identification gate. Consequently, when the first and second types of link plates are mixed together in the sample silent chain, it can be possible to place the various link plates in their respective designated configuration positions for assembly.

According to an aspect of a method for assembling the silent chain, an operational check step may be included in which, after assembly of the silent chain, whether the first and second link plates are respectively set at their designated positions may be checked by a sensor differentiated on the basis of the shape of the tooth tip part.

According to an aspect of a method for assembling the silent chain, an operational check step may be included in which after assembly of the silent chain, whether the first and second link plates are respectively set at their designated positions may be checked by a sensor differentiated on the basis of the shape of the shoulder part.

According to an aspect of a method for assembling the silent chain, an operational check step may be included in which, after assembly of the silent chain, whether the first and second link plates are respectively set at their designated positions may be checked by a sensor differentiated on the basis of the shapes of the tooth tip part and the shoulder part.

According to an aspect of the method for assembling the silent chain, after assembly of the silent chain, whether the first and second types of link plates are set at their respective designated positions may be checked by a sensor differentiated on the basis of the shape of the tooth tip part. Also, according to another aspect of the invention, after assembly of the silent chain, whether the first and second types of link plates are set at their respective designated positions may be checked by a sensor differentiated on the basis of the shape of the shoulder part. In addition, in yet another aspect of the invention, after assembly of the silent chain, whether the first and second types of link plates are set at their respective designated positions may be checked by a sensor differentiated on the basis of the shape of the tooth tip part and the shape of the shoulder part.

According to aspects of the invention described above, whether the first and second types of link plates are set at their respective designated positions may be checked by a sensor. Consequently, it may be possible to prevent shipment of mis-assembled silent chains.

DETAIL DESCRIPTION

Figure 1:
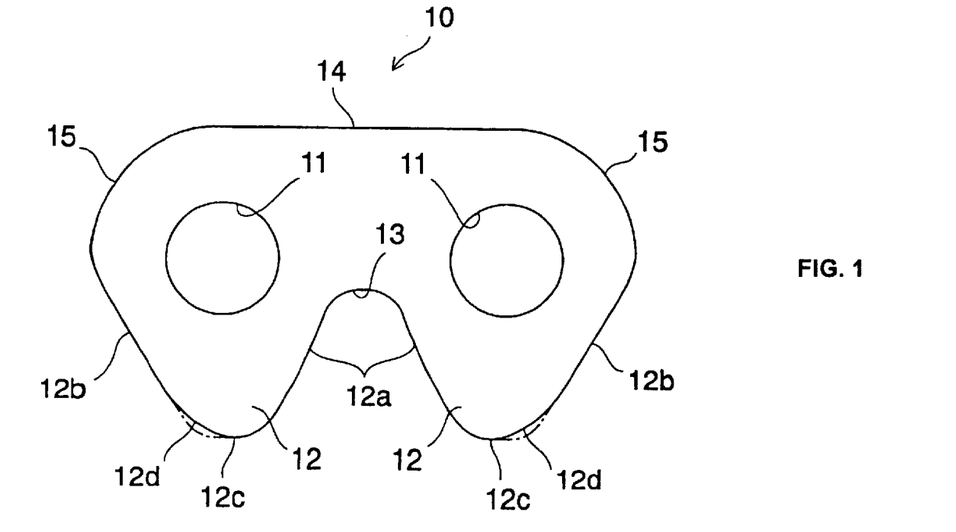
FIG. 1 is an enlarged front view of the link plate according to a first aspect of this invention.

FIG. 1 is a diagram illustrating the link plate according to a first aspect of the invention. In this figure, part numbers for the same or corresponding parts as in FIG. 8 have identical digits in the unit position.

The link plate 10 has a pair of pin holes 11 for inserting the connecting pins, and a pair of teeth extending downward. A tooth portion 12 has a nearly arcuate inside flank surface 12a, a nearly straight outside flank surface 12b, and a tooth tip part 12c that connects them. Adjacent inside flank surfaces 12a are connected by a crotch 13. Also, the link plate 10 has a back side part 14 that is nearly straight. The back side part 14 and the outside flank surface 12b are connected by a nearly arcuate shoulder part 15. On the tooth tip part 12c, a portion is cut off on the side toward the outside flank surface 12b to form a cut portion 12d that extends in nearly a straight line. Also, as illustrated in FIG. 1, the dot-dash line represents the shape of the tooth tip part of the conventional link plate shown in FIG. 8.

Figure 2:
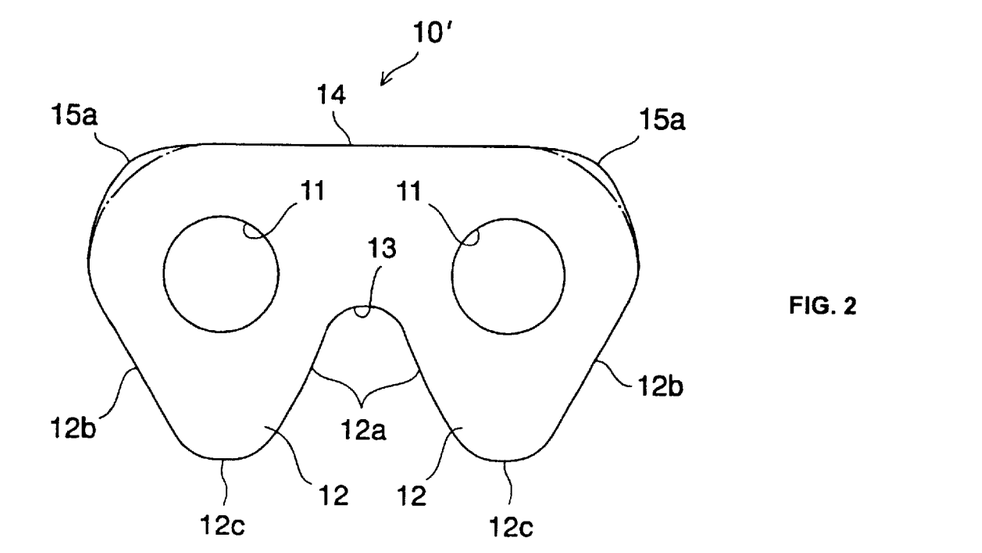
FIG. 2 is an enlarged front view of the link plate according to a second aspect of this invention.

FIG. 2 is a diagram illustrating the link plate according to a second aspect of the invention. In this figure, the same part numbers are used to represent the same or corresponding parts as in FIG. 1. Also, in FIG. 2, the dot-dash line represents the shape of the shoulder part of the conventional link plate shown in FIG. 8.

A bump portion 15a that projects outward is formed on the shoulder part of the link plate 10. The bump portion 15a has the shape of a bump that projects from the nearly arcuate shoulder part indicated by a dot-dash line of the conventional link plate.

Figure 3:
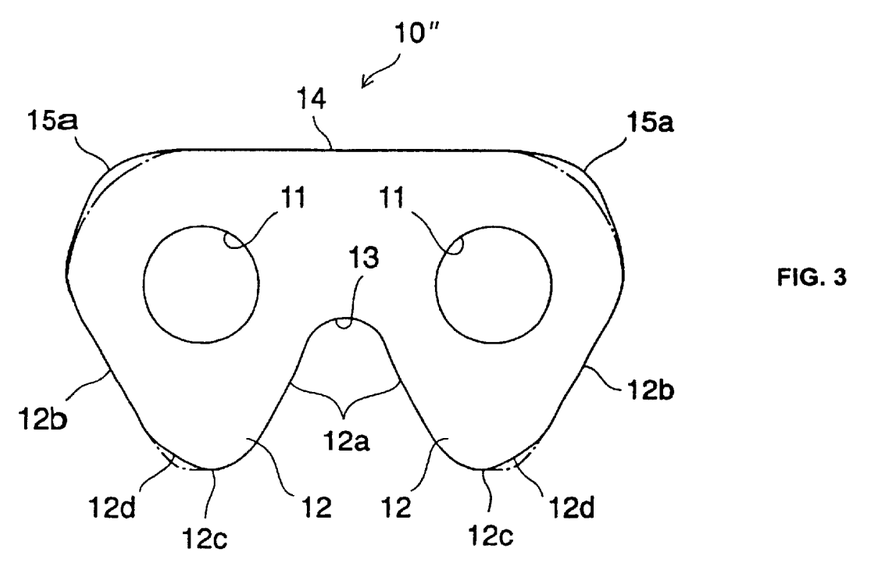
FIG. 3 is an enlarged front view of the link plate according to a third aspect of this invention.

FIG. 3 is a diagram illustrating the link plate according to a third aspect of the invention. In this figure, the same part numbers as in FIG. 1 or 2 are adopted to represent the same or corresponding parts, respectively. Also, the dot-dash line in FIG. 3 indicates the shape of the tooth tip part or shoulder part of the conventional link plate shown in FIG. 8.

For the tooth tip part 12c of the link plate 10", a portion is cut off on the side toward the outside flank surface 12b to form a cut portion 12d that extends almost in a straight line, and, at the same time, the bump portion 15a that projects outward is formed on the shoulder part.

The link plates 10, 10', 10" are different from each other with respect to one or several of the following properties: plate thickness, material, heat treatment, hardness, and whether or not there has been pinhole finish processing. In this case, the link plates 10, 10', 10" can be differentiated from each other based on the difference in the shape of the tooth tip part and/or the shape of the shoulder part.

For example, the link plates 10, 10' can be differentiated on the basis of the difference in the shape of the tooth tip part or the shape of the shoulder part. The link plates 10, 10" can also be differentiated on the basis of the difference in the shape of the shoulder part. The link plates 10', 10" can be further differentiated on the basis of the difference in the shape of the tooth tip part.

The difference in the shape of the tooth tip part and/or the shape of the shoulder part between the link plates can be detected by various types of sensors or identification gates. The specific examples are illustrated in FIGS. 4–6.

Figure 4:
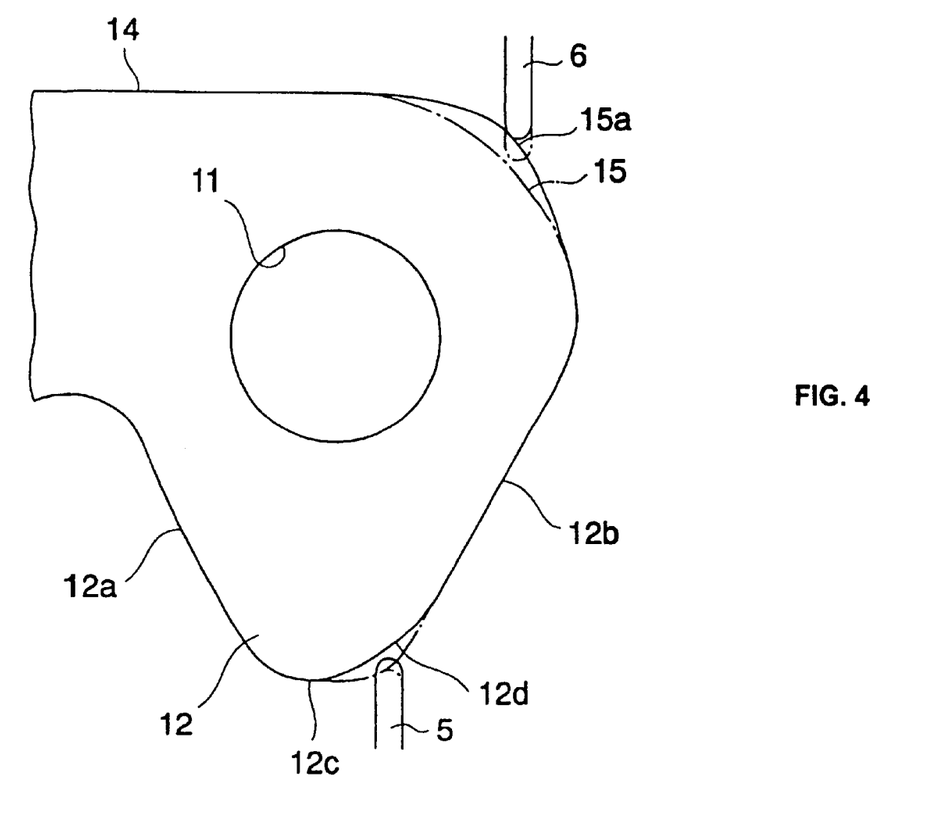
FIG. 4 is a diagram illustrating how the tooth tip part and shoulder part of the link plate are checked with a touch sensor.
Figure 5:
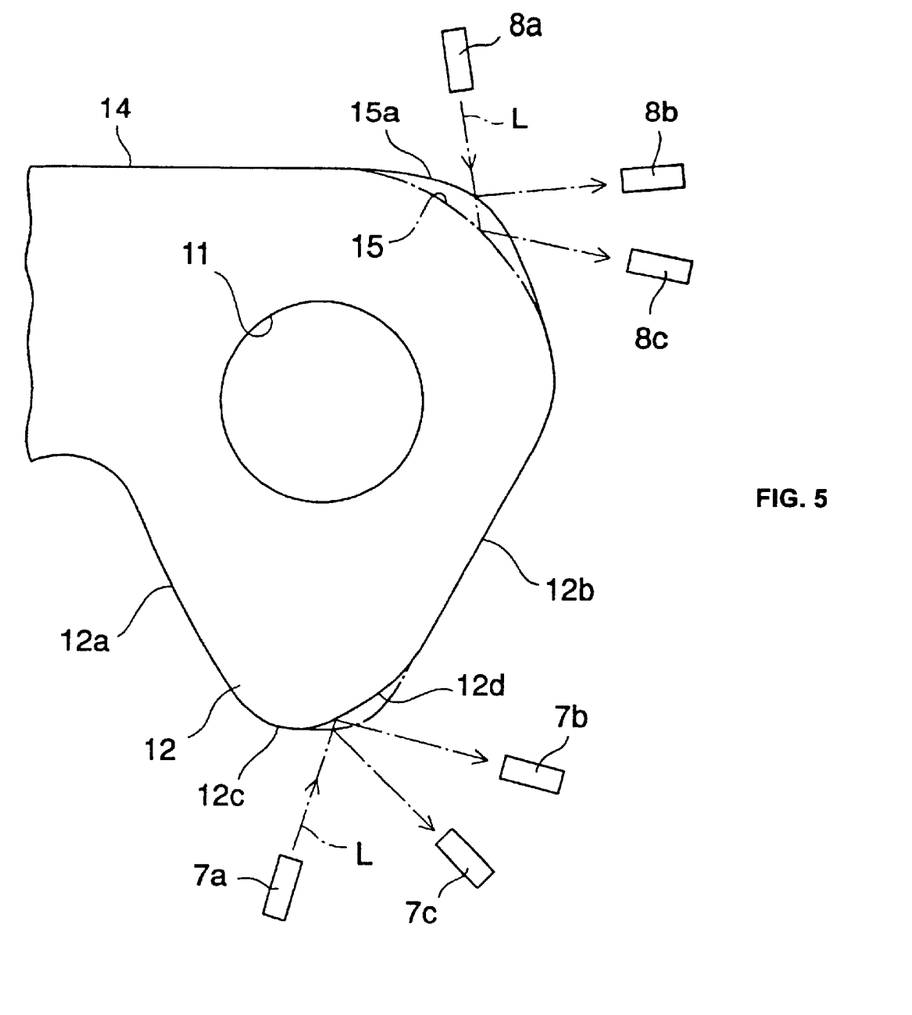
FIG. 5 is a diagram illustrating how the tooth tip part and shoulder part of the link plate are checked with a photo-electric switch.

FIG. 4 is a diagram illustrating an example of the situation when a touch sensor is used. As shown in this figure, a touch sensor 5 is arranged at the position of the cut portion 12d of the tooth tip part 12c of the link plate that is the object to be checked, and, at the same time, a touch sensor 6 is arranged at the position of the shoulder part 15 of the link plate.

In this case, when the touch sensor 5 is ON, it is possible to detect, for the link plate that is the detection object, whether it is the link plate 10' with the cut portion 12d formed on the tooth tip part 12c or the conventional link plate 20. On the other hand, when the touch sensor 5 is OFF, it is possible to detect, for the link plate that is the detection object, whether it is the link plate 10 or the link plate 10" with the cut portion 12*d* formed on the tooth tip part 12*c*.

Also, when the touch sensor 6 is ON, it is possible to detect, for the link plate that is the detection object, whether it is the link plate 10' or the link plate 10" with the bump portion 15*a* formed on the shoulder part 15. On the other hand, when the touch sensor 6 is OFF, it is possible to detect, for the link plate that is the detection object, whether it is the link plate 10 free of the bump portion 15*a* formed on the shoulder part 15 or the conventional link plate 20.

In this way, depending on the ON/OFF state of the touch sensors 5 or 6, it is possible to identify the type of the link plate that is the detection object. Also, one may also make use of a proximity switch near the touch sensor.

FIG. 5 is a diagram illustrating an example of use of a laser type photoelectric switch. As shown in this figure, a light projection unit 7*a* of the photoelectric switch is positioned near the tooth tip part 12*c* of the link plate that is the detection object, and the following parts are also put in place: a light receiving unit 7*b* that receives light from a laser beam L that exits from the light projection unit 7*a* and is reflected from the cut portion 12*d* of the link plate, and a light receiving unit 7*c* that receives laser light reflected from the tooth tip part 12*c* of the link plate which has no cut portion 12*d*.

Also, a light projection unit 8*a* of the photoelectric switch is positioned near the shoulder part of the link plate, and the following parts are also put in place: a light receiving unit 8*b* that receives the light from a laser beam L that exits from the light projection unit 8*a* and is reflected from the bump portion 15*a* of the shoulder part of the link plate, and a light receiving unit 8*c* that receives the light reflected from the shoulder part 15 of the link plate which has no bump portion 15*a*.

In this case, when the laser light is received by the light receiving unit 7*b*, it is possible to detect whether the link plate that is the detection object is the link plate 10 or the link plate 10" with the cut portion 12*d* formed on the tooth tip part 12*c*. On the other hand, when the laser light is received by the light receiving unit 7*c*, it is possible to detect whether the link plate that is the detection object is the link plate 10' with the cut portion 12*d* formed on the tooth tip part 12*c* or the conventional link plate 20.

Also, when the laser light is received by the light receiving unit 8*b*, it is possible to detect whether the link plate that is the detection object is the link plate 10' or the link plate 10" with the bump portion 15*a* formed on the shoulder part 15. On the other hand, when the laser light is received by the light receiving unit 8*c*, it is possible to detect whether the link plate that is the detection object is the link plate 10 with the bump portion 15*a* formed on the shoulder part 15 or the conventional link plate 20.

In this way, depending on which light receiving unit receives the laser light, it is possible to identify the type of the link plate that is the detection object.

Figure 6A:
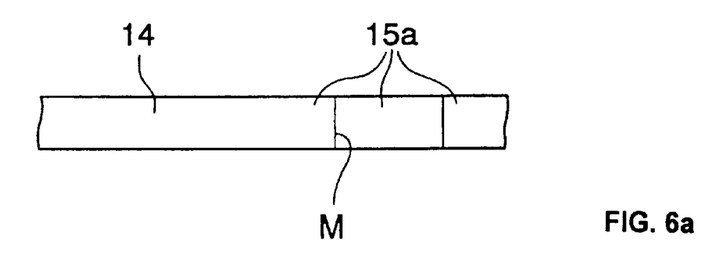
FIG. 6 is a diagram illustrating how the tooth tip part and shoulder part of the link plate are checked with an image sensor.
Figure 6B:
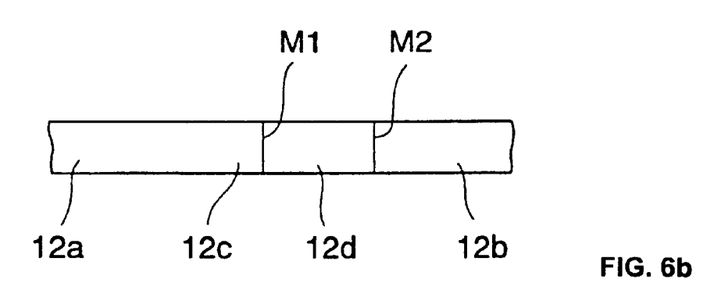

In the following, an example using an image sensor will be explained with reference to FIG. 6. FIG. 6*a* is an end view from the back side of the link plate. FIG. 6*b* is an end view from the side of the tooth tip part of the link plate. As can be seen from these figures, when the bump portion 15*a* is formed on the shoulder part of the link plate, the top portion of the bump portion 15*a* appears as a crest line M on the end surface of the link plate. Also, when the cut portion 12*d* is formed on the tooth tip part 12*c* of the link plate, the connecting surface between the tooth tip part 12*c* and the cut portion 12*d* appears as a crest line M1, and, at the same time, the connecting plane between the cut portion 12*d* and the outside flank surface 12*b* appears as a crest line M2.

Consequently, by detecting the crest lines M, M1 and M2 by means of an image sensor, it is possible to identify the type of the link plate that is the detection object.

Figure 7:
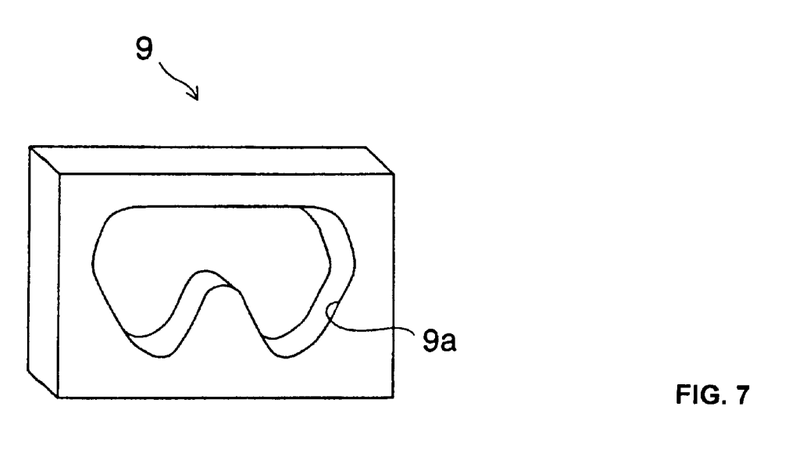
FIG. 7 is an overall oblique view of the identification gate for the link plates.

In the following, an example in which an identification gate is used will be explained with reference to FIG. 7. FIG. 7 is a diagram illustrating the identification gate. On the identification gate 9, a hole 9*a* is formed in a shape corresponding to the contour of the link plate to be selected. In this case, the link plate is identified depending on whether it can pass through the hole 9*a* of the identification gate 9.

For example, when an identification gate j is formed with a hole shaped to correspond to the contour of the link plate 10, the only link plate that can pass through the identification gate j is the link plate 10. The link plates 10' and 10" that cannot pass through the identification gate j, are sent to an identification gate k with a hole shaped to correspond to the contour of the link plate 10". The link plate that passes through the identification gate k is the link plate 10", while the link plate that fails to pass through it is the link plate 10'. In this way, it is possible to differentiate the various types of link plates from each other.

As explained above, it is possible to differentiate the link plates 10, 10', 10" from each other. Consequently, when these link plates are mixed together in assembling a silent chain, they can be placed at the respective desired positions.

For example, supposing that the plate thickness of the link plate 10 is 1.2 mm and the plate thickness of the link plate 10" is 1.0 mm, when the link plates 10 and 10" are assembled to form a silent chain, one can select the link plates 10, 10" by means of the sensors or identification gates so as to position, for example, the link plate 10 on the outermost side and in the central portion of the link train, and to place the link plate 10" in the other positions as the silent chain is assembled from a mixed configuration of the link plates. This operation can be performed automatically on an assembly machine.

Also, it is possible to use the various sensors to check whether the link plates are placed in their respective designated positions after assembly of the silent chain. In this way, it is possible to prevent shipment of mis-assembled products.

As explained in detail above, for the link plate of this invention, a portion of the tooth tip part is cut off to form a prescribed shape, and/or a bump portion is formed projecting outward from the shoulder part. Consequently, the link plate provided by this invention can be differentiated by appearance from the other link plates. Also, this invention provides a type of silent chain having link plates that can be differentiated from each other when arranged in a mixed configuration, and a method for assembling the silent chain. In addition, this invention provides a method to check whether the two types of link plates are placed in their respective designated positions in the silent chain.

What is claimed is:

1. A method for assembling a silent chain, the method comprising:

providing at least a plurality of a first link plate configuration with a first outer perimeter and a plurality of a second link plate configuration with a second outer perimeter, the first and second link plate perimeters each including a pair of teeth each having an inside flank, an outside flank, and a tooth tip part therebetween, and a backside part opposite the pair of teeth having a shoulder part between the back side part and each outside flank;

providing an identifying feature on the outer perimeter of the first link plate configuration, the identifying feature constituting a minor portion of the first link perimeter being at least one of a recess formed on the tooth proximate the outside flank surface and a bump projecting outwardly from the shoulder;

identifying the first link plates by the first link plate identifying feature;

identifying the second link plates by the absence of the first link plate identifying feature; and positioning the first and second link plates in a predetermined arrangement for assembly into the silent chain.

2. A method for assembling a silent chain according to claim 1, including providing an identifying feature on the second link perimeter, the second link plate identifying feature being different from the first link plate identifying feature, identifying the second link plates by the second link plate identifying feature, and identifying the first link plates by the absence of the second link plate identifying feature.

3. A method for assembling a silent chain according to claim 2, including identifying the first and second link plate identifying features with one or more sensors.

4. A method for assembling a silent chain according to claim 2, including identifying the first and second link plate identifying features with one or more identification gates.

5. A method for assembling a silent chain according to claim 2, wherein the first link plate identifying feature is a bump projecting outwardly from the shoulder and the second link plate identifying feature is a recess on a portion of the tooth proximate the outside flank surface.

6. A method for assembling a silent chain according to claim 1, including identifying the first link plate identifying feature with a sensor.

7. A method for assembling a silent chain according to claim 1, including identifying the first link plate identifying feature with an identification gate.

8. A method for assembling a silent chain according to claim 1, wherein the first link plate identifying feature is a recess formed on the tooth proximate the outside flank surface.

9. A method for assembling a silent chain according to claim 1, wherein the first link plate identifying feature is a bump projecting outwardly from the shoulder.

10. A method for assembling a silent chain according to claim 1, wherein the first link plate identifying feature is a bump projecting outwardly from the shoulder and a recess on a portion of the tooth proximate the outside flank surface.

11. A plate for a silent chain distinguishable from other link plates, the link plate comprising:

an outer perimeter having a pair of teeth each having an inside flank, an outside flank and a tooth tip part therebetween, and a back side part opposite the pair of teeth having a shoulder part between the back side part and each outside flank; and an identification feature formed on the perimeter effective to distinguish the link plate from the other link plates during assembly of the silent chain, the identification feature constituting a minor portion of the perimeter being at least one of a recess formed on the tooth proximate the outside flank surface and a bump projecting outwardly from the shoulder.

12. A link plate according to claim 11, wherein the identification feature is a recess formed on the tooth tip part proximate the outside flank.

13. A link plate according to claim 11, wherein the identification feature is a bump projecting outwardly from the shoulder.

14. A link plate according to claim 11, wherein the identification feature is a recess formed on the tooth tip part proximate the outside flank and a bump projecting outwardly from the shoulder.

15. A silent chain comprising:

a plurality of a first link plate configuration with a first outer perimeter and a plurality of a second link plate configuration with a second outer perimeter, each perimeter having a pair of teeth each having an inside flank, an outside flank and a tooth tip part therebetween, and a back side part opposite the pair of teeth having a shoulder part between the back side part and each outside flank;

an identifying feature formed on the outer perimeter of the first link plate configuration, the first link plate identifying feature constituting a minor portion of the first link perimeter being at least one of a recess formed on the tooth proximate the outside flank surface and a bump projecting outwardly from the shoulder;

an identifying feature formed on the outer perimeter of the second link plate configuration, the second link plate identifying feature constituting a minor portion of the first link perimeter being at least one of a recess formed on the tooth proximate the outside flank surface and a bump projecting outwardly from the shoulder different from the first link plate identifying feature; and an arrangement of the first and second link plate configuration according to the first and second link plate identifying features for assembly into the silent chain.

16. A silent chain according to claim 15, wherein the first link plate identifying feature is a recess formed on the tooth tip part proximate the outside flank and the second link plate identifying feature is a bump projecting outwardly from the shoulder.

17. A silent chain according to claim 15, wherein the first link plate identifying feature is a recess formed on the tooth tip part proximate the outside flank and a bump projecting outwardly from the shoulder and the second link plate identifying feature is a bump projecting outwardly from the shoulder.

18. A silent chain according to claim 15, wherein the first link plate identifying feature is a recess formed on the tooth tip part proximate the outside flank and a bump projecting outwardly from the shoulder and the second link plate identifying feature is a recess formed on the tooth tip part proximate the outside flank.

* * * * *